(12) United States Patent
Cui et al.

(10) Patent No.: US 8,095,449 B2
(45) Date of Patent: Jan. 10, 2012

(54) METHOD AND SYSTEM FOR GENERATING AN AUCTION USING A PRODUCT CATALOG IN AN INTEGRATED INTERNAL AUCTION SYSTEM

(75) Inventors: Yan Cui, Sunnyvale, CA (US); Rowell Sotto, Mountain View, CA (US); Lenin K Subramanian, Palo Alto, CA (US); Anisha Dadhia, San Jose, CA (US); Yue Fang, Sunnyvale, CA (US); Zhong Zhang, Los Altos, CA (US)

(73) Assignee: SAP AG, Walldorf (DE)

( * ) Notice: Subject to any disclaimer, the term of this patent is extended or adjusted under 35 U.S.C. 154(b) by 1000 days.

(21) Appl. No.: 11/591,150

(22) Filed: Oct. 31, 2006

(65) Prior Publication Data

US 2007/0143206 A1 Jun. 21, 2007

(51) Int. Cl.
*G06Q 40/00* (2006.01)
(52) U.S. Cl. .... 705/37; 705/26.3; 705/26.43; 705/26.44
(58) Field of Classification Search ............... 705/37, 705/26.3, 26.43, 26.44
See application file for complete search history.

(56) References Cited

U.S. PATENT DOCUMENTS

| | | | |
|---|---|---|---|
| 5,101,353 A | 3/1992 | Lupien et al. |
| 5,774,553 A | 6/1998 | Rosen |
| 5,774,873 A | 6/1998 | Berent et al. |
| 5,835,896 A | 11/1998 | Fisher et al. |
| 5,890,138 A | 3/1999 | Godin et al. |
| 6,047,268 A | 4/2000 | Bartoli et al. |
| 6,058,416 A | 5/2000 | Mukherjee et al. |
| 6,076,074 A | 6/2000 | Cotton et al. |
| 6,266,652 B1 | 7/2001 | Godin et al. |
| 6,285,989 B1 | 9/2001 | Shoham |
| 6,304,858 B1 | 10/2001 | Mosler et al. |
| 6,370,547 B1 | 4/2002 | Eftink |
| 6,388,183 B1 | 5/2002 | Leh |
| 6,408,282 B1 | 6/2002 | Buist |
| 6,415,270 B1 | 7/2002 | Rackson et al. |
| 6,415,320 B1 | 7/2002 | Hess et al. |
| 6,442,258 B1 | 8/2002 | Mashinsky |

(Continued)

OTHER PUBLICATIONS

R. Preston McAfee, Daniel C. Quan, Daniel R. Vincent, "How to Set Minimum Acceptable Bids, with An Application to Real Estate Auctions," *The Journal of Industrial Economics*, vol. 50 No. 4, Dec. 2002, pp. 391-416. Retrieved via ProQuet.
Mestelman, S., Welland, D., "Experience and inventory management in double-auction markets," Journal of Economic Behavior and Organization, 26(1995) pp. 35-48.
Auctionwatch Buy Now Storefronts FAQ.pdf, 20010609.
Auction Wizard 2000 Tourinventory, 20021011.
How to Use-Auction Manager Pro-Inventory Management, 20010417.

(Continued)

*Primary Examiner* — Jagdish Patel
*Assistant Examiner* — Kevin Poe
(74) *Attorney, Agent, or Firm* — Kenyon & Kenyon LLP (57) ABSTRACT

A seller may use an existing product catalog in a seller business information management system to generate an auction and populate auction parameters to expedite and facilitate the auction creation process. The information in the product catalog may be used to provide auction parameters (populate auction fields) in addition to adding a product and/or service to the auction. An auction profile may also be defined for a seller and may contain data or rules for generating an auction that may be used to provide additional default values for the auction. One or more auction profiles may be associated with a seller. The seller selects a product from the catalog and chooses a create auction option resulting in an auction being generated from the product information and the profile, if one exists. The seller may then modify the auction parameters and add or drop products before saving the auction.

8 Claims, 7 Drawing Sheets

U.S. PATENT DOCUMENTS

| | | |
|---|---|---|
| 6,442,558 B1 | 8/2002 | Brown et al. |
| 6,510,216 B1 | 1/2003 | Burr et al. |
| 6,609,108 B1 | 8/2003 | Pulliam et al. |
| 6,745,350 B1 | 6/2004 | Cline et al. |
| 6,792,399 B1 | 9/2004 | Phillips et al. |
| 6,868,525 B1 | 3/2005 | Szabo |
| 6,871,190 B1 | 3/2005 | Seymour et al. |
| 6,971,105 B1 | 11/2005 | Weber et al. |
| 6,983,395 B2 | 1/2006 | Chen et al. |
| 7,047,210 B1 | 5/2006 | Srinivasan |
| 7,107,227 B1 | 9/2006 | Bezos et al. |
| 7,110,967 B1 | 9/2006 | Espenes et al. |
| 7,136,903 B1 | 11/2006 | Phillips et al. |
| 7,149,720 B2 | 12/2006 | Shepherd |
| 7,158,944 B1 | 1/2007 | Settle, III |
| 7,191,147 B2 | 3/2007 | Heene et al. |
| 7,209,895 B2 | 4/2007 | Kundtz et al. |
| 7,216,103 B2 | 5/2007 | Friedland et al. |
| 7,228,287 B1 | 6/2007 | Samson et al. |
| 7,237,717 B1 | 7/2007 | Rao et al. |
| 7,249,061 B1 | 7/2007 | Suzuki |
| 7,263,498 B1 | 8/2007 | Van Horn et al. |
| 7,289,967 B1 | 10/2007 | Brader-Araje et al. |
| 7,310,610 B2 | 12/2007 | Fujita et al. |
| 7,324,968 B2 | 1/2008 | Rotman et al. |
| 7,330,826 B1 * | 2/2008 | Porat et al. ................. 705/26.3 |
| 7,457,778 B2 | 11/2008 | Li et al. |
| 7,461,022 B1 | 12/2008 | Churchill et al. |
| 7,490,242 B2 | 2/2009 | Torres et al. |
| 7,493,280 B2 | 2/2009 | Guler et al. |
| 7,505,935 B2 | 3/2009 | Mendiola et al. |
| 7,552,081 B2 | 6/2009 | Dutta et al. |
| 7,627,500 B2 | 12/2009 | Zhang et al. |
| 2001/0029478 A1 | 10/2001 | Laster et al. |
| 2001/0037255 A1 | 11/2001 | Tambay et al. |
| 2001/0042041 A1 | 11/2001 | Moshal et al. |
| 2001/0044751 A1 | 11/2001 | Pugliese et al. |
| 2001/0049654 A1 | 12/2001 | Cecchetti et al. |
| 2001/0054021 A1 | 12/2001 | Kawakura et al. |
| 2002/0002500 A1 | 1/2002 | Takahashi |
| 2002/0026400 A1 * | 2/2002 | Narayan et al. ................. 705/37 |
| 2002/0032018 A1 | 3/2002 | Morton et al. |
| 2002/0032621 A1 | 3/2002 | Smith et al. |
| 2002/0046153 A1 | 4/2002 | Piggins |
| 2002/0049738 A1 | 4/2002 | Epstein |
| 2002/0062251 A1 | 5/2002 | Anandan et al. |
| 2002/0069157 A1 | 6/2002 | Jordan |
| 2002/0072999 A1 | 6/2002 | Andres et al. |
| 2002/0082974 A1 | 6/2002 | Berstis |
| 2002/0082977 A1 | 6/2002 | Hammond et al. |
| 2002/0087456 A1 | 7/2002 | Abeshouse et al. |
| 2002/0095357 A1 | 7/2002 | Hunter et al. |
| 2002/0095441 A1 | 7/2002 | Lakhani et al. |
| 2002/0099641 A1 | 7/2002 | Mills et al. |
| 2002/0107779 A1 | 8/2002 | Maltzman |
| 2002/0111874 A1 | 8/2002 | Al-Kazily |
| 2002/0111895 A1 | 8/2002 | Blair |
| 2002/0116215 A1 | 8/2002 | Lawrence et al. |
| 2002/0116281 A1 | 8/2002 | Costello et al. |
| 2002/0116318 A1 * | 8/2002 | Thomas et al. ................. 705/37 |
| 2002/0120552 A1 * | 8/2002 | Grey et al. ................. 705/37 |
| 2002/0128913 A1 | 9/2002 | Ower |
| 2002/0138342 A1 | 9/2002 | Clark et al. |
| 2002/0138399 A1 | 9/2002 | Hayes et al. |
| 2002/0143909 A1 | 10/2002 | Botz et al. |
| 2002/0147655 A1 | 10/2002 | Say |
| 2002/0165817 A1 | 11/2002 | Rackson et al. |
| 2002/0178104 A1 | 11/2002 | Hausman |
| 2002/0178166 A1 | 11/2002 | Hsia |
| 2002/0188551 A1 * | 12/2002 | Grove et al. ................. 705/37 |
| 2002/0194051 A1 | 12/2002 | Hall et al. |
| 2003/0036975 A1 | 2/2003 | Martin et al. |
| 2003/0051164 A1 | 3/2003 | Patton |
| 2003/0055668 A1 | 3/2003 | Saran et al. |
| 2003/0126150 A1 | 7/2003 | Chan |
| 2003/0154134 A1 | 8/2003 | Wang |
| 2003/0163831 A1 | 8/2003 | Gall et al. |
| 2003/0220867 A1 | 11/2003 | Goodwin et al. |
| 2004/0024731 A1 | 2/2004 | Cabrera et al. |
| 2004/0093525 A1 | 5/2004 | Larnen |
| 2004/0098333 A1 | 5/2004 | Meesseman |
| 2004/0117293 A1 | 6/2004 | Lammle et al. |
| 2004/0128224 A1 | 7/2004 | Dabney et al. |
| 2004/0158549 A1 | 8/2004 | Matena et al. |
| 2004/0220821 A1 | 11/2004 | Ericsson et al. |
| 2004/0250009 A1 | 12/2004 | Chen et al. |
| 2004/0267719 A1 | 12/2004 | Doherty et al. |
| 2005/0010483 A1 | 1/2005 | Ling |
| 2005/0018667 A1 | 1/2005 | Chandra et al. |
| 2005/0033648 A1 | 2/2005 | Jin et al. |
| 2005/0033683 A1 | 2/2005 | Sacco et al. |
| 2005/0080714 A1 | 4/2005 | McHale et al. |
| 2005/0097005 A1 | 5/2005 | Fargo |
| 2005/0114225 A1 | 5/2005 | Longman et al. |
| 2005/0114229 A1 | 5/2005 | Ackley et al. |
| 2005/0165650 A1 * | 7/2005 | Kothapalli et al. ............. 705/26 |
| 2005/0187859 A1 | 8/2005 | Growney et al. |
| 2005/0197950 A1 * | 9/2005 | Moya et al. ................. 705/37 |
| 2005/0203824 A1 | 9/2005 | Freud et al. |
| 2005/0209904 A1 | 9/2005 | Hayashi |
| 2005/0262000 A1 | 11/2005 | Sato |
| 2005/0283425 A1 | 12/2005 | Grove et al. |
| 2005/0289042 A1 | 12/2005 | Friesen |
| 2006/0004648 A1 | 1/2006 | Singh et al. |
| 2006/0015449 A1 * | 1/2006 | Underwood et al. ........... 705/37 |
| 2006/0074752 A1 * | 4/2006 | Newmark ................. 705/14 |
| 2006/0155637 A1 | 7/2006 | Hawkes et al. |
| 2006/0184443 A1 | 8/2006 | Erez et al. |
| 2007/0011082 A1 | 1/2007 | Lynch |
| 2007/0043647 A1 | 2/2007 | Bickford |
| 2007/0179879 A1 | 8/2007 | Pomeranz et al. |
| 2007/0203820 A1 | 8/2007 | Rashid |
| 2007/0214075 A1 * | 9/2007 | Ablan ................. 705/37 |
| 2007/0239594 A1 | 10/2007 | Conwell |
| 2007/0299765 A1 | 12/2007 | Smith et al. |
| 2008/0133426 A1 * | 6/2008 | Porat et al. ................. 705/80 |
| 2008/0294544 A1 | 11/2008 | Harrington et al. |
| 2009/0030813 A1 | 1/2009 | Wiesehuegel et al. |

OTHER PUBLICATIONS

Auctionwatch How to Use auction manager pro 0611 112001 www.auctionwatch.com|help|ampro|amprohowo~v31_bach.htm(1l of 7) accessed Feb. 24, 2008.

www.auctionwatch.com. Dec. 4, 2001. Recovered from www.Archive.org on Feb. 1, 2008.

AuctionWatch Business Solution Services.pdf, 20010616.

Auction Watch Products.pdf, 20020802.

Overstock, Oct. 2004, http://web.archive.org/web/20040912-20041102re_/http://overstock.com.

Flaim, Denise, "The E-Shopper: Playing A Hardball Game on eBay," Newsday, Long Island, NY, Jun. 6, 2001, p. C07.

Spanbauer, Scott, "How to Make Cash on eBay: Your Auction ABSs," PC World, Jul. 2003, vol. 21, Iss. 7, p. 150.

Auction Tamer, Apr. 9, 2003, http://web.archive.org/web/20030409155905/http://www.auctiontamer.com/auctionlisting.htm.

D.5.2, Creation of high performance DG-related databases for Information Services, M. Nov. 21, 2003, accessible (but protected) at http://www.iset.uni-kassel.de/dispowerstatic/documents/de152.pdf.

Envision Software, Inc.: Auction Tamer-Seller Add-on/Auction Poster Pro Feature, http://auctiontamer.com/auctionlisting.htm. pp. 1-13.

Geldman, A., "Evaluating e-Bay Seller Software," http://www.auctionbytes.com/cab/abu/v204/m05/abu0119/s02, pp. 1-3.

"I Pivot delivers new internet traffic appliances that eliminate error messages and optimize performance of Web Portals and Heavily Trafficked Content Sites," Business Wire: May 10, 1999, p. 1.

Hoxmeier et al., "A framework for the sustainability of e-marketplaces", Business Porcess Management Journal, v10n3, pp. 277-290 (2004).

"Novantus CRM Software Propels Success of First Online Auction Bonding Program; Novantus Deploys CRM Platform for buySAFE in Record Time," Business Wire: New York: Feb. 23, 2004, p. 1.

* cited by examiner

| Seller Identifier 411 | Profile Identifier 412 | Start Date and Time 413 | End Date and Time 414 | Auction Type 415 | Etc 416 |
|---|---|---|---|---|---|
| A | 1 | Next day, midnight | 7 days | Full-lot | ... |
| B | 2 | 3 days later, noon | 14 days | Partial-lot | ... |
| C | 3 | Next day, noon | 5 days | Full-lot | ... |

| Seller Identifier 461 | Profile Identifier 462 |
|---|---|
| D | 5 |
| E | 5 |
| F | 8 |

| Auction Identifier 511 | Product 512 | Quantity 513 | Start Date and Time 514 | End Date and Time 515 | Etc 516 |
|---|---|---|---|---|---|
| 521 X | Model A07 Laptop | 1 | 9/15/2005 00:00 | 9/22/2005 00:00 | ... |
| 522 Y | M-09 Flatscreen | 3 | 9/18/2005 12:00 | 9/25/2005 12:00 | ... |
| 523 Z | M-11 Flatscreen | 10 | 9/20/2005 23:30 | 9/30/2005 23:30 | ... |

| Auction Identifier 561 | Product 562 | Quantity 563 |
|---|---|---|
| 571 P | M-09 Flatscreen | 5 |
| 572 P | M-11 Flatscreen | 4 |
| 573 Q | Model A07 Laptop | 10 |

METHOD AND SYSTEM FOR GENERATING AN AUCTION USING A PRODUCT CATALOG IN AN INTEGRATED INTERNAL AUCTION SYSTEM

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for providing integrated auction services through a seller's e-commerce site. In particular, the present invention relates to using a seller's product catalog in creating auctions in an internal auction system.

BACKGROUND

Businesses traditionally look for effective ways in which to make their products available to potential buyers. In addition to sales through physical "brick and mortar" stores, innovative ways to sell products are often used especially to dispose of old or excess inventory. The advent of the Internet along with the accompanying revolution in computer and network technology has created new sales paradigms and allowed businesses to establish their own electronic commerce ("e-commerce") presence through the use of, for example, Internet Web sites. E-commerce sales have steadily grown and now account for a significant portion of business-to-consumer as well as business-to-business sales. Auctions make up a significant portion of e-commerce sales and have grown into an increasingly more important sales paradigm.

The revolution in network and computer capability along with the mass availability and development of the Internet facilitates alternative methods of sales such as auctions. Network-based electronic auctions, such as for example those conducted over the Internet, may allow a seller considerable control over an auction and may increase auction participation. For example, a seller may want to limit participation in the auction where the pool of potential customers is limited or where allowing an open auction may, in some manner, hinder the auction process. In another example where an auction may be open to all potential bidders it is often beneficial to maximize the number of people participating in the auction in order to extract the greatest price for the product or lot being auctioned. The Internet and network-based computing provide the ability to aggregate large numbers of bidders for an auction in an easier and generally less costly manner than through traditional auctions. Though network-based auctions (e.g., Internet based auctions) provide significant advantages, the reliance on third party auction providers has limited a seller's control in a number of ways including through rules on the conformance of auction procedures and the loss of control over restricting auction participation and bidding.

Third party auction providers provide a large scale e-commerce community portal that brings together large numbers of buyers and sellers who gather to trade in goods and services. Everyday, millions of items across thousands of categories are available on third party auction providers for sale by auction and for a fixed price, enabling trade on a local, national, and international basis with customized Internet Web sites in markets around the world. These third party auction providers may provide auction services for the seller as well as access to a ready pool of potential buyers but in exchange they may require a seller to conform their auctioning processes and procedures. In addition, a third party auction provider typically takes a fee that may be fixed or proportional to the value of the auctioned goods and/or services. In both cases, the seller loses some degree of control over the auction process in exchange for using the third party auction service.

In addition to the limitations on auction procedures and processes imposed by a third party auction provider, a business may not be able to make maximum use of its business information in providing and generating auctions through a third party auction service. Businesses have typically kept their information, including information regarding their assets and inventory they wish to sell or auction off, in database systems that are part of their corporate information systems. Conventional systems provide limited linking between these business information management systems and online Web auction services, and, therefore, manual involvement with the Web auction service is required for each auction or sales posting conducted. These problems may be overcome and the limitations of third party auction services avoided by providing auction services through a seller's own e-commerce site. In this manner, full advantage may be taken by linking a seller's business information management systems with its e-commerce site allowing greater automation of the auction submission, tracking, and post-auction processing. An integrated internal auction system solves these problems in a novel manner providing considerable advantages to a seller. In this manner, a seller may be able to integrate a product catalog into the auction creation process in an internal auction system.

DETAILED DESCRIPTION

According to one embodiment of the present invention, a method and system for providing an integrated auction capability through a seller e-commerce site is provided through an integrated internal auction system. The integrated internal auction system may include a seller-side application to allow a seller to generate an auction using an available seller business information management system, publish the auction on a seller e-commerce network site, process an auction winner, and monitor ongoing auctions in a manner leveraging a seller's existing business information management systems and e-commerce network sites. The internal auction system may also include a buyer-side application to provide buyer functionality on a seller e-commerce network site to view and participate in published auctions, to monitor auctions and bidding, and to perform any necessary checkout procedures on winning an auction. The internal auction system may serve as the conduit between seller's business information management system(s) and e-commerce site(s) while providing seller and/or buyer functionality to implement an integrated auction capability under the seller's internal control (i.e., without using an external third party auction provider or facilitator).

In one embodiment of the present invention, a seller may be able to use an existing product catalog in one or more of seller's business information management systems to rapidly generate an auction and populate auction information data to expedite and/or facilitate the auction creation process. The information in the product catalog may be used to provide auction parameters (populate auction fields) in addition to adding a product and/or service to the auction. For example, a product may have associated auction rules in a seller business information management system. A seller may browse the product catalog and select a desired product resulting in not only an auction being created for the product but the associated auction rules being used in (imported into) the auction. The example embodiments discussed herein mostly relate to an auction for a product but it should be understood that a product and/or service may be used interchangeably in these embodiments. For example, the product catalog could just as easily contain a catalog of available services or may be a mixed catalog of products and services.

An auction profile may be defined for a seller according to one embodiment of the present invention. The auction profile may contain data or rules for generating an auction that can be used as a default to rapidly create an auction for a seller. For example, a seller auction profile may include auction rules which may be incorporated by default into an auction generated by a seller when the seller does not otherwise specify the auction rules. In another example, an auction start date and time and duration value may be rules in an auction profile such as begin auction at Midnight three days after the auction is created and end auction seven days after auction begins. These example rules may be used to automatically generate an auction start date and time and an auction end date and time by default when an auction is created if the seller has not otherwise specified these values according to one embodiment. In one embodiment, a single auction profile may be associated with a seller and is used to generate default auction parameters when an auction is first created and these parameters are not provided by the seller. In another embodiment, one or more auction profiles may be associated with a seller with one of the auction profiles defined as the default profile. According to this embodiment, the default profile is used to provide values for the auction parameters not specified by a seller when the auction is first created unless the seller selects one of the other profiles which will then be used instead. In this embodiment, a seller may have multiple profiles which may be used to provide default values for an auction.

In one embodiment of the present invention, a seller may browse a product catalog. The seller selects a product and/or service from the catalog and then chooses a create auction option which results in an auction being generated for the product and/or service. The product information may be used to populate some or all of the auction parameters. In addition, an auction profile for the seller, if one exists, may be used to provide default values for other unspecified auction parameters. The created auction may be presented to the seller who may modify the parameters, enter values for required parameters where no default values exist, add additional products or services, and/or who may save the auction. According to this embodiment, the auction is generated directly from the product catalog.

In another embodiment of the present invention, the seller may initiate the auction creation process using an internal auction application then browse the product catalog to select a product and/or service for the auction. According to this embodiment, the auction creation process is initiated by the seller using the internal auction application before browsing the product catalog whereas in the prior embodiments, the seller initiated the auction creation process using an option while browsing the product catalog. For example according to this embodiment, the seller chooses a "create auction from product catalog" option using the internal option application initiating the auction creation process. The seller is then presented a view of the product catalog from which to choose the product. In the prior embodiment, the seller may browse the product catalog. While browsing the product catalog, the seller may select one or more products and/or services and then choose a "create auction" option to generate the auction for the selected product and/or services. Regardless of which embodiment is used, an auction profile may be used for the seller or the seller may enter the auction parameters where default values do not exist for the seller.

According to one embodiment of the present invention, the internal auction application links a seller e-commerce site (i.e., a seller network site) with a seller existing business information management system(s) in order to provide auction services to buyers (customers) through the seller e-commerce site. A seller e-commerce site according to this embodiment may be any electronic business presence that a seller provides to potential buyers. For example, a seller Web site on the Internet that offers information on or purchase of seller's products can be considered a seller e-commerce site. A seller business information management system according to this embodiment may be any seller information system containing product and/or sales and marketing information that may be used in the provision of products to a buyer. For example, a seller inventory system that tracks the availability of seller products may be considered one form of many potential seller business information management systems. A seller business information management system implies business applications using a programming and/or program interface working with a database to accomplish one or more tasks. However, according to this embodiment a seller business information management system may be considered either the database and the interface to access the database by itself as well as this database and associated interface in conjunction with associated applications. The internal auction application according to this embodiment provides the functionality to implement the auctioning of seller products (i.e., products sold by the seller) on the seller e-commerce site in conjunction with using at least one of the seller business information management systems. In one embodiment, the internal auction application is a component-based multi-tier application developed according to the Java® 2 platform, enterprise edition standard (J2EE®) and running on top of a web application server (WAS). The internal auction application is linked to a business information management system using business information management system plug-ins to tie the internal auction application to the business information management system backend functions.

Figure 1:
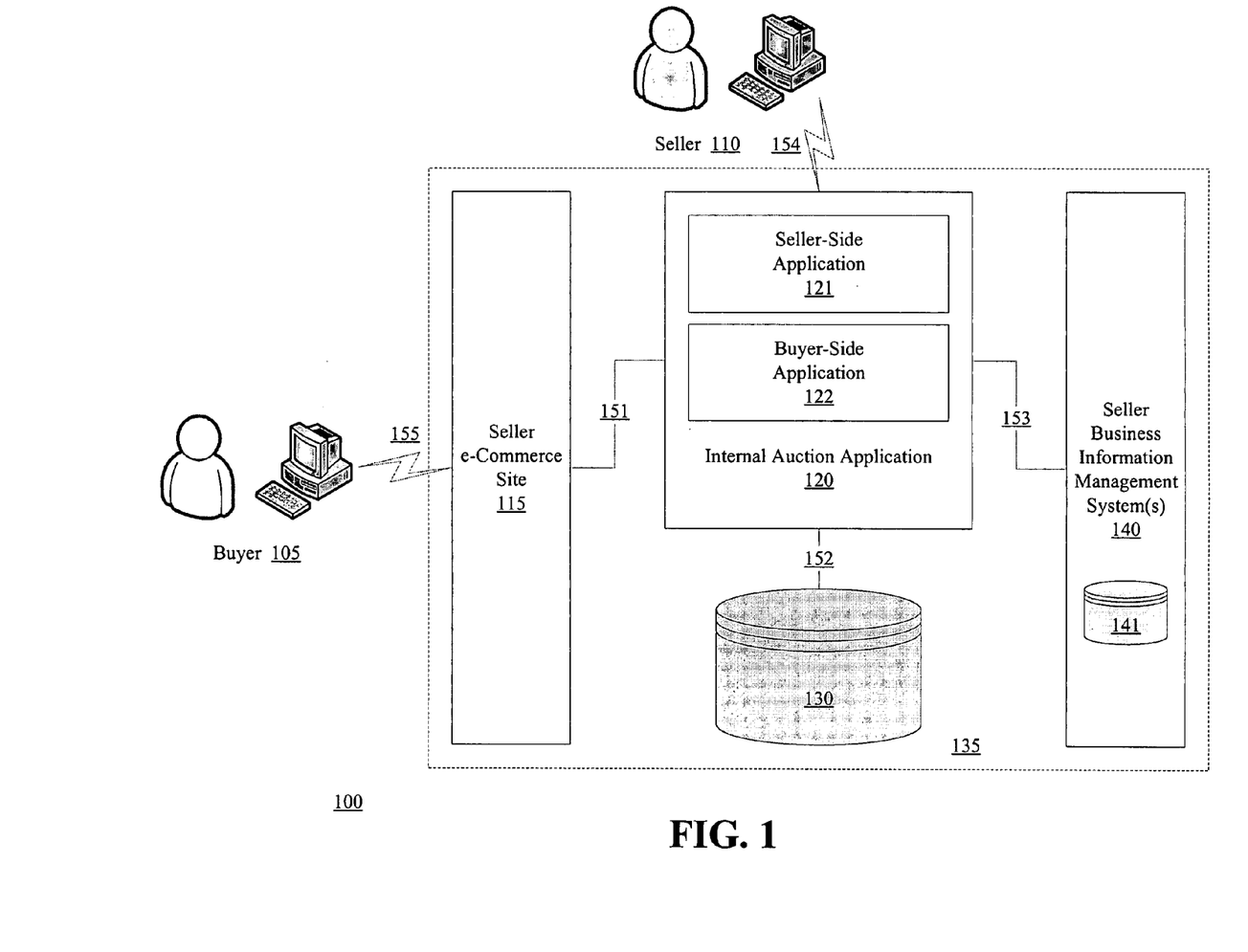
FIG. 1 is a diagram illustrating the integrated internal auction system according to one embodiment of the present invention.

FIG. 1 is a diagram illustrating the integrated internal auction system according to one embodiment of the present invention. A seller 110 may create an auction using an internal auction application 120 residing on the seller information technology hardware environment 135. For example, the internal auction application 120 may consist of one or more software applications, programs, modules, procedures, or other computer code to include firmware and may additionally include data that resides on one or more servers, computers, or other hardware platforms that make up the seller information technology hardware environment 135. The internal auction application 120 may be conceptualized as containing a seller-side application 121 handling the seller interaction 154 with the integrated internal auction system 100 through the internal auction application 120. The seller-side application 121 may provide the functionality allowing the seller 110 to create, monitor, and manage one or more auctions. The internal auction application 120 may also be conceptualized as containing a buyer-side application 122 handling the buyer interaction 155 with the integrated internal auction system 100 allowing buyer interaction 155 with the internal auction application 120 and the seller business information management system(s) 140 through a seller e-commerce site 115. The buyer-side application 122 may provide the functionality allowing the buyer 105 to view auctions, participate in active auctions, monitor auctions, and perform the checkout process on won auctions. Though conceptually the functionality provided by the seller-side application 121 and the buyer-side application 122 of the internal auction application 120 are different, both may share data sets, procedures, libraries, and other elements of software code or data. In one embodiment of the present invention, all the elements of the internal auction application 120 may either be contained in both the conceptual subsets—seller-side application 121 and buyer-side application 122—or in an alternative embodiment the internal auction application 120 may contain additional elements of software code and/or data in addition to these conceptual subsets 121, 122. The internal auction application 120 may use data contained in a seller's business information management system(s) 140 and/or stored in a local database 130 for the internal auction application 120. This local database 130 may be considered part of the internal auction application 120 in this embodiment of the present invention even if the database is stored separately in a memory or storage system.

An internal auction application 120 may communicate 152 with the local database 130; communicate 153 with the seller business information management system(s) 140; and communicate 151 with the seller e-commerce site 115 using a communication network that is part of the seller information technology hardware environment 135. For example, the seller e-commerce site 115, internal auction application 120, local database 130, and business information management system(s) 140 may be located on servers or other computers that are part of a communication network—such as a local area network (LAN) or wide area network (WAN)—controlled by the seller. In an alternative embodiment, the seller information technology hardware environment 135 may include a communication network that is shared by the seller with other network users. For example, the seller e-commerce site 115, internal auction application 120, local database 130, and business information management system(s) 140 may be located on servers or other computers that are part of at least one internal seller communication network (e.g., a LAN and/or WAN) as well as a shared (i.e., shared by seller with other non-seller related entities) communication network such as the Internet. In either embodiment regardless of the network used for communication between the elements of the integrated auction system 100, seller communication 154 and buyer communication 155 with the integrated auction system 100 may occur over an external network (i.e., a network external to the seller and not under the seller's direct control), such as for example, the Internet. In an alternative embodiment, seller and buyer communication 154, 155 with the integrated auction application 100 may occur over a seller-controlled network (such as a seller-controlled wide area sales network) and/or may involve a combination of at least one seller-controlled network and at least one external network.

The integrated auction system 100 integrates a seller business information management systems(s) 140, which serves as a backend system(s), with a seller e-commerce site 115, serving as a front-end system, using an internal auction application 120 in order to provide auction services to the seller 110 and the buyer 105 according to one embodiment of the present invention. A seller business information management system 140 is a an application with at least one associated database 141 typically using a database management system (DBMS) that provides data storage and associated programming support for that data (e.g., a query system such as an SQL editor, optimization routines, program interfaces). For example, a seller may have an inventory control system 140 with its own inventory database. The business information management system(s) 140 may contain product information and availability information used in generating an auction and performing order generation to fulfill a winning bidder's order according to one embodiment of the present invention. The seller e-commerce site 115 allows a buyer 105 to participate in an auction over a communication network. For example, a seller Web site on the Internet offering goods and/or services (electronic commerce) is one example of a seller e-commerce site 115. An auction in the integrated auction system 100 is made available to the buyer 105 through the seller e-commerce site 115 which may serve as the buyer portal to the integrated auction system 100 according to one embodiment of the present invention. The seller 110 creates and manages auctions through the internal auction application 120 which integrates 153 information from the business information management system(s) 140 and provides the interaction processing 151 with the buyer 105 through the seller e-commerce site 115.

Figure 2:
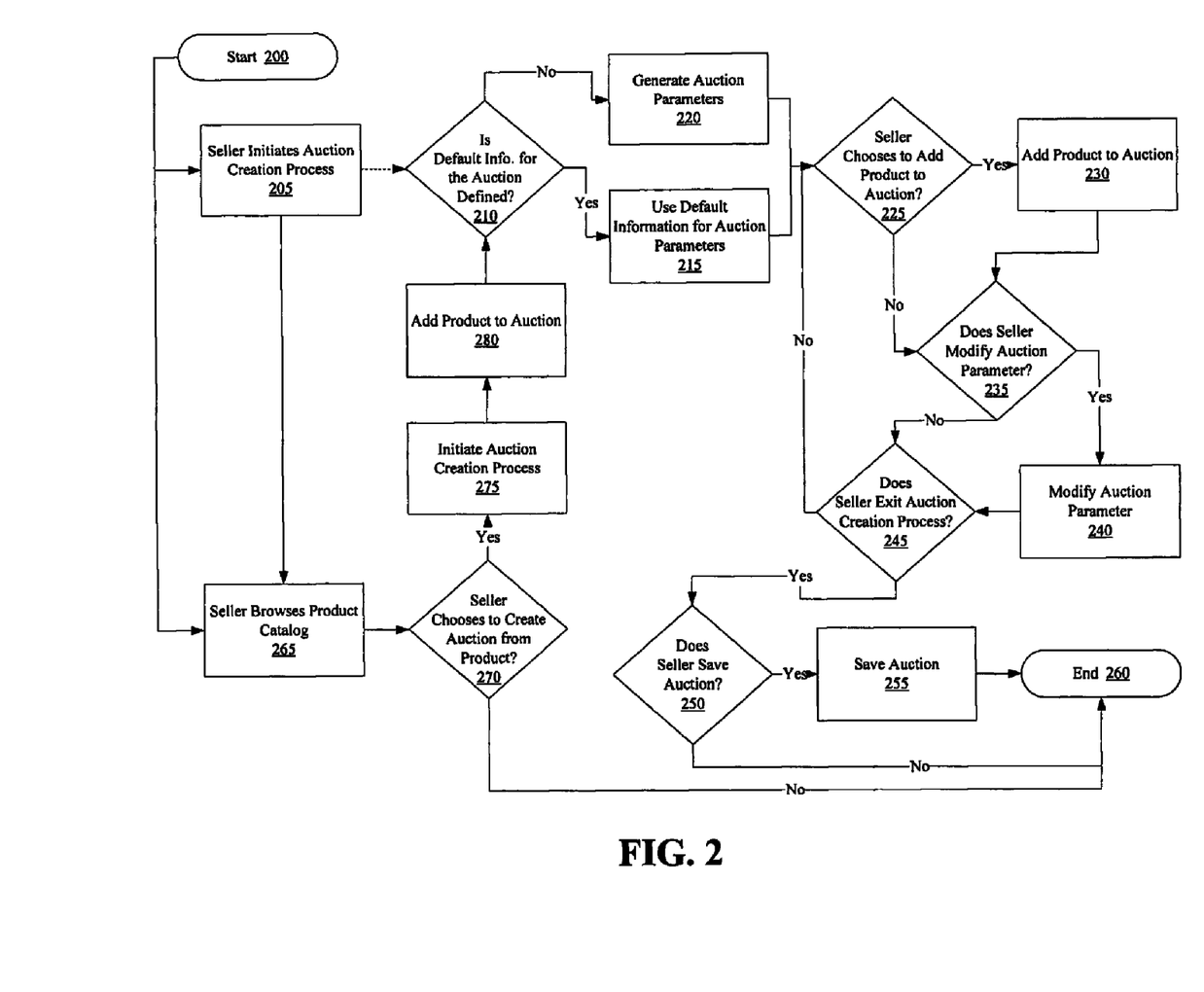
FIG. 2 is a flowchart illustrating the process of generating an auction from a product catalog in an internal auction system using an internal auction application according to one embodiment of the present invention.

FIG. 2 is a flowchart illustrating the process of generating an auction from a product catalog in an integrated internal auction system using an internal auction application according to one embodiment of the present invention. The process begins 200 with a seller 110 using a seller-side application 121 of an internal auction application 120. According to this embodiment, the seller 110 may choose an option in the internal auction application 120 to create an auction 205 or the seller 110 may instead browse a product catalog 265. By choosing to create an auction 205 first, the seller 110 may initiate the auction creation process 205 before browsing a product catalog. Once the auction creation process is initiated 205, the seller 110 may then browse a product catalog 265 to continue the auction creation process according to this embodiment. The dashed line connecting the steps 205 and 210 indicates what the process may otherwise be like without browsing the product catalog according to this embodiment of the present invention. In another embodiment of the present invention, the seller 110 may begin by first browsing the product catalog 265. As previously stated, the product catalog may contain products and/or services offered by a seller to customers. The product catalog may be contained in one or more seller business information management systems.

In either embodiment, the seller 110 may select one or more products and services in the catalog 270 to add to the auction (in one embodiment where the auction creation process is first initiated) or to create the auction from selected product and services in the catalog 270 (in the second embodiment where the auction is created from the selected product catalog entries). The option to create the auction from the selected products may be presented to the seller in the product catalog and/or it may be presented as an option (e.g., a button or pull-down menu option) in an internal auction application 120 screen presenting the product catalog information to the seller from the seller business information management system 140. According to one embodiment where the seller 110 first initiates the auction creation process 205, selecting a product or service to add to the auction 270 from the product catalog continues the auction creation process 275 and results in the selected product and/or service being added to the auction 280. In another embodiment where the seller 110 first browses the product catalog 265, selecting a product or service for the product catalog for an auction 270 initiates the auction creation process 275 and results in an auction being initiated according to the selected product and/or service.

The products and/or services in the product catalog may have associated information in the seller business information management systems 140 that may be used to establish default values for the auction parameters 210. For example, certain auction rules may be associated with a particular product and initiating an auction for the product from the product catalog may result in the associated rules becoming the default rules for the auction. In addition, one or more auction profiles may be defined for a seller 110. An auction profile may contain default information to use when creating an auction. For example, an auction profile may specify as a default value that an auction will have a duration of seven days. Using this profile, the end date and time for the auction may be set by default to seven days after the start date and time. In one embodiment, the seller 110 may have only no auction profile defined or only one auction profile for default values 210. According to this embodiment, the auction profile if defined 210 may be used to provide default values 215 (e.g., auction parameters) along with the associated product information. In another embodiment, one or more auction profiles may be defined for a seller 110. According to this embodiment, the default auction profile (if one exists) may be used to provide default values 215 for the auction if the seller 110 does not select from the available auction profiles. If no default profile exists, the seller 110 may choose one of the auction profiles 210 to use for default auction information (e.g., auction parameters) along with the associated product information according to this embodiment. In either embodiment, a determination may be made 210 whether default auction information exists (e.g., an auction profile and/or associated product information). If default auction information exists 210, that information may be used to provide auction parameter values 215. If default auction information does not exist or exits for only some of the parameters 210, some or all of the auction parameters values may need to have a default value generated 220 according to this embodiment. The default value may be determined or no value may be provided in different embodiments where default auction information does not already exist. In an alternative embodiment, the seller 110 may be prompted for auction parameters for which there is no default value 220.

Once the auction is initiated with default values as appropriate, the seller 110 may choose to add, modify, or remove products and/or services from the auction 225. The seller 110 makes these changes 230, such as adding a product to the auction, and continues with the auction creation process. The seller 110 may also choose to modify the auction parameters including the default values 235. If the seller 110 does choose to modify the auction parameters 235, the appropriate modifications are made 240. Any changes the seller 110 may make may require validation of the provided values (e.g., a data being in the appropriate format and range). The seller 110 decide at anytime to exit the auction creation process 245 or the seller may continue to make modifications to the products and services and to modify the auction parameters in any sequence. Once the seller 110 exits from the auction creation process 245, the seller 110 may decide whether to save the auction 250 resulting the auction data being save 255 or aborting the auction 250. Whether the auction is saved or aborted 250, the auction creation process then concludes 260 according to this embodiment shown in FIG. 2. In an alternative embodiment, once the auction is initiated with default values as appropriate 215, 220, the auction is saved 255 and the auction creation process concludes 260. The seller 110 may now use the seller-side application in this alternative embodiment to, for example, modify, publish, activate, or delete the auction.

Figure 3:
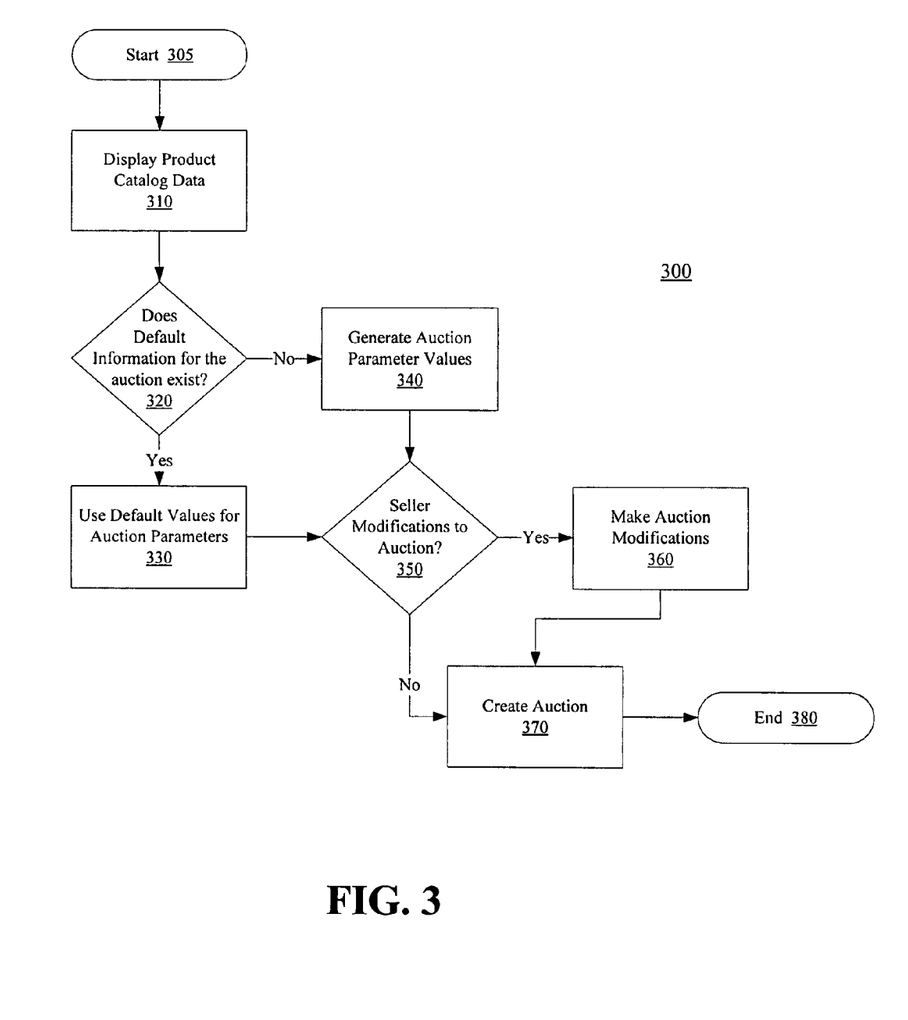
FIG. 3 is a flowchart illustrating an example process for generating an auction from a product catalog in an internal auction system according to one embodiment of the present invention.

FIG. 3 is a flowchart illustrating an example process for generating an auction from a product catalog in an integrated internal auction system according to one embodiment of the present invention. In a first step 310, the example process 300 begins 305 by displaying a product catalog to the seller 110 according to this embodiment. The product catalog may be displayed to the seller 110 either using the internal auction application 140 or it may be displayed to the seller 110 directly through a seller business information management system 140. For example, the product catalog may be displayed within a screen of the seller-side application 121 of the internal auction application 140. The product catalog data is received by the internal auction application 120 from the seller business information management system 140. In this example, a seller 110 may select one or more products and/or services in the catalog on the internal auction application 120 screen and then the seller 110 may select an option, such as a conventional button or link, to generate the auction from the selected products and/or services. The option to generate the auction may be part of the internal auction application 120 screen or may be embedded in the displayed product catalog in this example. In another example, the product catalog may be displayed to seller 110 directly by the seller business information management system 140 without the seller 110 first using the internal auction application 120. In this example, the display of the product catalog data contains an option, such as a conventional button or link, to generate the auction from the selected products and/or services in the catalog. Generating the auction according to this second example may initiate the seller-side application 121 of the internal auction application 120 to handle the auction creation process. As previously stated, though a product catalog is defined according to this example embodiment, other embodiments of the present invention may work with other data including, for example, a catalog of mixed products and services and a catalog of just services.

In a second step 320, a determination may be made whether default auction parameter values are available for the seller 110. For example, these default auction values may be stored in an auction profile for the seller 110 or they may be defined in a default template for the seller 110. Default auction values may include data or rules that allow auction parameters to be determined. For example, a default quantity for a product or service may have a value of one-data—while a start date and time may be midnight the next day after an auction is created—a rule. If default values are available, the default values are used for the auction parameters in a third step 330. If default values are not available, values for the auction parameters may be generated using general rules that are not specific to a seller 110 in an alternative third step 340 in this example process. Default values, if available, may exist for all of the auction parameters necessary to create an auction or they may exist for only some of those auction parameters. Where the default values exist for only some of the necessary auction parameters a combination of the two alternative third steps 330, 340 may be used. The end result of the steps one through three 310-340 may be an auction tentatively initiated for the selected products and/or services with default auction parameters specified.

In a fourth step 350, a seller 110 may be presented with the auction information put together so far according to one embodiment of the present invention. The seller 110 may then be able to modify the auction information such as, for example, adding or deleting products and/or services from the auction and modifying the auction parameters which may contain default values. If the seller 110 decides to modify the auction parameters 350 the necessary modification are made 360 in a fifth step consistent with any validation rules for the fields and types of data involved. The decision to modify the auction 350 and the making of modifications 360 may be iterative. In an alternative embodiment of the present invention, the auction information is generated using any available default information without seller 110 interaction to modify the auction other than the initial seller 110 selection of the product and/or service.

Once the auction information is identified, the auction is created in a sixth step 370 according to this example embodiment. Though a temporary set of data for the auction may have been created following the seller initiating this process 300 of creating an auction from a product catalog, the final auction information is saved in this final step 370 before the process 300 terminates 380. Creating the auction may involve saving and storing the auction in a database 130 local to the internal auction application 120 as shown in FIG. 1. Though the auction is created in the sixth step 370 of this process, it may or may not be published or activated in various embodiments of the present invention. For example in one embodiment, the created auction will not be published or activated until a seller 110 action specifies the publishing or activating of the auction. In another embodiment, the created auction is immediately published and becomes available to customers when the start and end date and time is reached. In another embodiment, the auction is immediately activated (without regard for any specified start date and time).

Figure 4A:
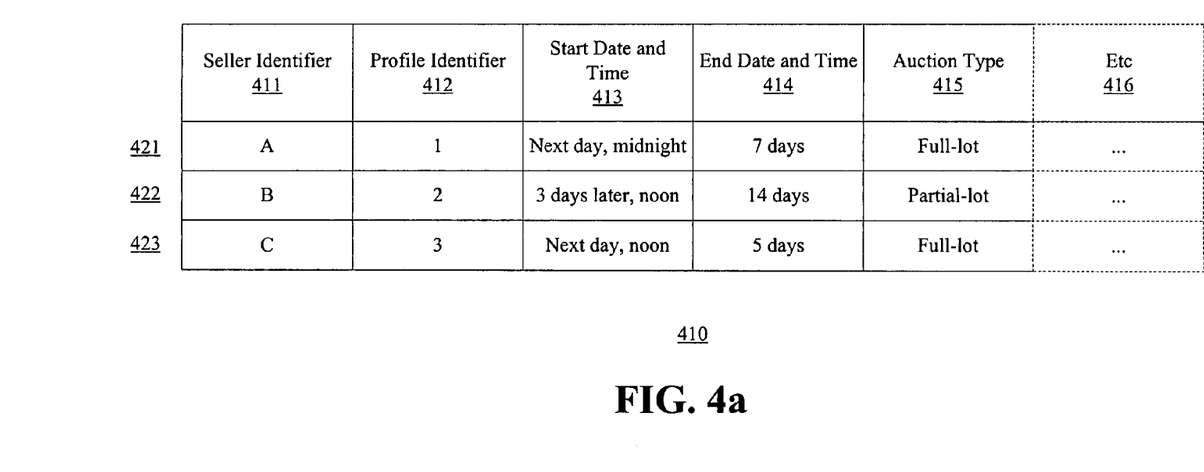
FIG. 4a is an example database table for storing an auction profile for a seller in an integrated internal auction system according to one embodiment of the present invention.

FIG. 4a is an example database table for storing an auction profile for a seller in an integrated internal auction system according to one embodiment of the present invention. The auction profile table 410 may include from no rows to multiple rows 421-423 of data with each row in the table associating a seller 110 with an auction profile in an integrated internal auction system 100 as shown in FIG. 1. The rows 421-423 of the auction profile table 410 show a simplified example of the data that may exist for an auction profile according to one embodiment of the present invention. The term record, row, and tuple are interchangeable herein to refer to a record/row/tuple of data, the terms table and file are interchangeable herein to refer to a table/file of a database, and the terms field and cell are interchangeable herein to refer to a field/cell in row. These terms are not intended to imply a particular database structure (e.g., a hierarchical database or a relational database) for an embodiment of the present invention. Embodiments of the present invention may work effectively using any known database type and this example is not limited to a particular database structure.

The auction profile table 410 may include a number of rows each describing one auction profile. The columns in the table may contain both rules and data as previously described. A seller may be identified using a unique seller identifier stored in the seller identifier column 411 of the auction profile table 410. For example in the first row 421 of the auction profile table 410 the seller identifier is "A" while in the second row 422 it is "B" and in the third row 423 it is "C". A profile may be identified using a unique auction profile identifier stored in the auction profile identifier column 412 of the auction profile table 410. For example in the first row 421, the profile identifier is 1. In addition to an auction profile identifier 412, an auction profile table may also include a start date and time column 413 containing rules for the default start date and time of an auction. For example, in the first row 421 of the auction profile table 410 the default start date and time value is a rule indicating that an auction will start by default on the day after it is created at midnight. In addition to a start date and time column 413, an end date and time column 414 may also be included in the profile indicating when an auction will by default end. For example in the first row 421 of the auction profile table 410, the auction will conclude by default at midnight seven days after the auction began 413. An auction type column 415 may also be included in the profile indicating the type of auction to be run by default. For example, in the first row 421 of the auction profile table 410, the auction type is a full-lot auction indicating that all the products and/or services in the auction must be bid on and won (i.e., purchased) together. In the second row 422 of the auction profile table 410, the auction type is a Partial-lot auction indicating that highest bidder may win a partial quantity of the products and/or services included in the auction with the next highest bidder possibly winning an other partial quantity until the entire quantity of the products and/or services in the auction are won. The Etc. column 416 is shown to indicate that other columns of data may also be included in an auction profile and in the auction profile table 410. For this reason, the Etc. column 416 is shown in dashed lines.

Figure 4B:
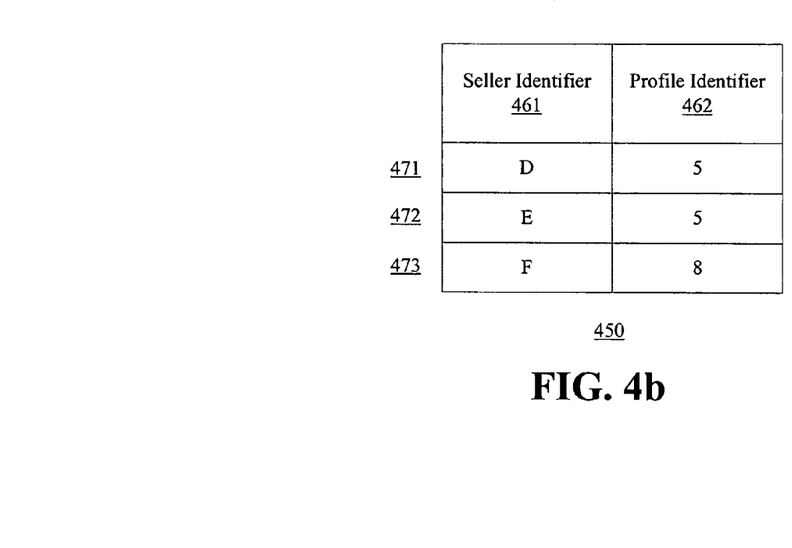
FIG. 4b is an example database lookup table for storing an association or linking of a seller with an auction profile in an integrated internal auction system according to one embodiment of the present invention.

FIG. 4b is an example database lookup table for storing an association or linking of a seller with an auction profile in an integrated internal auction system according to one embodiment of the present invention. The seller-to-profile lookup table 450 shown is an alternative embodiment of the present invention from the auction profile table 410 shown in FIG. 4a. In this embodiment, an auction profile table 410 similar to the one shown in FIG. 4a is used to store the auction profile information but no seller identifier 411 is included in the table. Instead, a seller is associated or linked to an auction profile using the separate lookup table 450. In this manner an auction profile may be shared with multiple sellers as indicated by the pairing of a seller identifier 461 and a profile identifier 462 in the lookup table 450. In the first row 471 of the seller-to-profile lookup table 450, seller "D" is linked to profile 5 while seller "E" is also associated with profile 5 in the second row 472 of the lookup table 450. In a third row 473, seller "F" is associated with a separate profile 8.

Figures 5A, 5B:
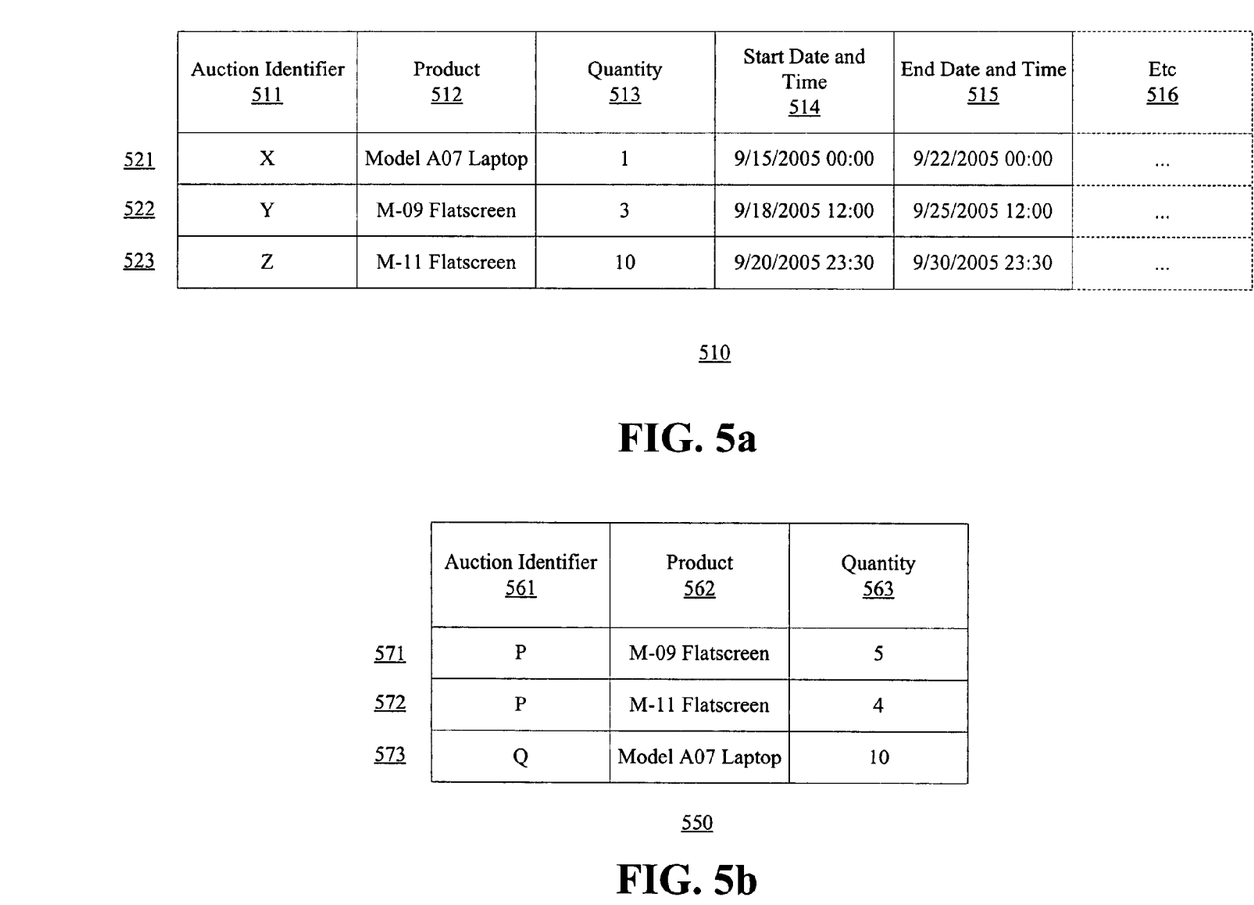
FIG. 5a is an example database table for storing auction information in an integrated internal auction system according to one embodiment of the present invention.
FIG. 5b is an example database table for storing an association or linking of an auction with a product in an integrated internal auction system according to one embodiment of the present invention.

FIG. 5*a* is an example database table for storing auction information in an integrated internal auction system according to one embodiment of the present invention. The auction data table 510 may include from no rows to multiple rows 521-523 of data with each row in the table providing the details for a single auction in an integrated internal auction system 100 as shown in FIG. 1. The rows 521-523 of the auction data table 510 show a simplified example of the data that may exist for an auction according to one embodiment of the present invention.

The auction data table 510 may include a number of rows each describing one auction. An auction may be identified using a unique auction identifier stored in the auction identifier column 511 of the auction data table 510. For example in the first row 521 of the auction data table 510 the auction identifier is "X" while in the second row 522 it is "Y" and in the third row 523 it is "Z". A product may be identified using a unique product identifier stored in the product column 512 of the auction data table 510. For example in the first row 521, the product is "Model A07 Laptop". In addition to the product 512, an auction data table may also include a quantity column 513 (or lot size column) indicating the quantity of the product included in the auction. Additional auction parameters in the auction data table 510 may include a start date and time column 514 specifying the date and time the auction is scheduled to start. For example, in the first row 521 of the auction data table 510 the specified start date is Sep. 15, 2005 with midnight ("00:00" using a 24-hour clock) as the start time. In addition to a start date and time column 514, an end date and time column 515 may also be included in the auction parameters indicating when an auction will end. For example in the first row 521 of the auction data table 510, the auction will conclude on Sep. 22, 2005 at midnight. The Etc. column 516 is shown to indicate that other columns of data may also be included for the auction in the auction data table 510. For this reason, the Etc. column 516 is shown in dashed lines.

FIG. 5*b* is an example database table for storing an association or linking of an auction with a product in an integrated internal auction system according to one embodiment of the present invention. The auction-to-product table 550 shown is an alternative embodiment of the present invention from the auction data table 510 shown in FIG. 5*a* and may be used where there are multiple products and/or services for an auction. In this embodiment, an auction data table 510 similar to the one shown in FIG. 5*a* is used to store the auction information but no product 512 or quantity 513 columns are included in the table. Instead, an auction is associated or linked to a product and/or service using the separate table 550. In this manner an auction may include multiple products and/or services in a normalized manner with only one entry of auction parameter information in the auction data table 510. In the first row 571 of the auction-to-product table 550, auction "P" 561 includes 5 units 563 of "M-09 Flatscreen" product 562. A second row 572 in the auction-to-product table 550 indicates that auction "P" 561 also includes 4 units 563 of "M-11 Flatscreen" product 562. A third row 573 in the auction-to-product table 550 indicates that auction "Q" 561 includes 10 units 563 of "Model A07 Laptop" product 562.

Figure 6:
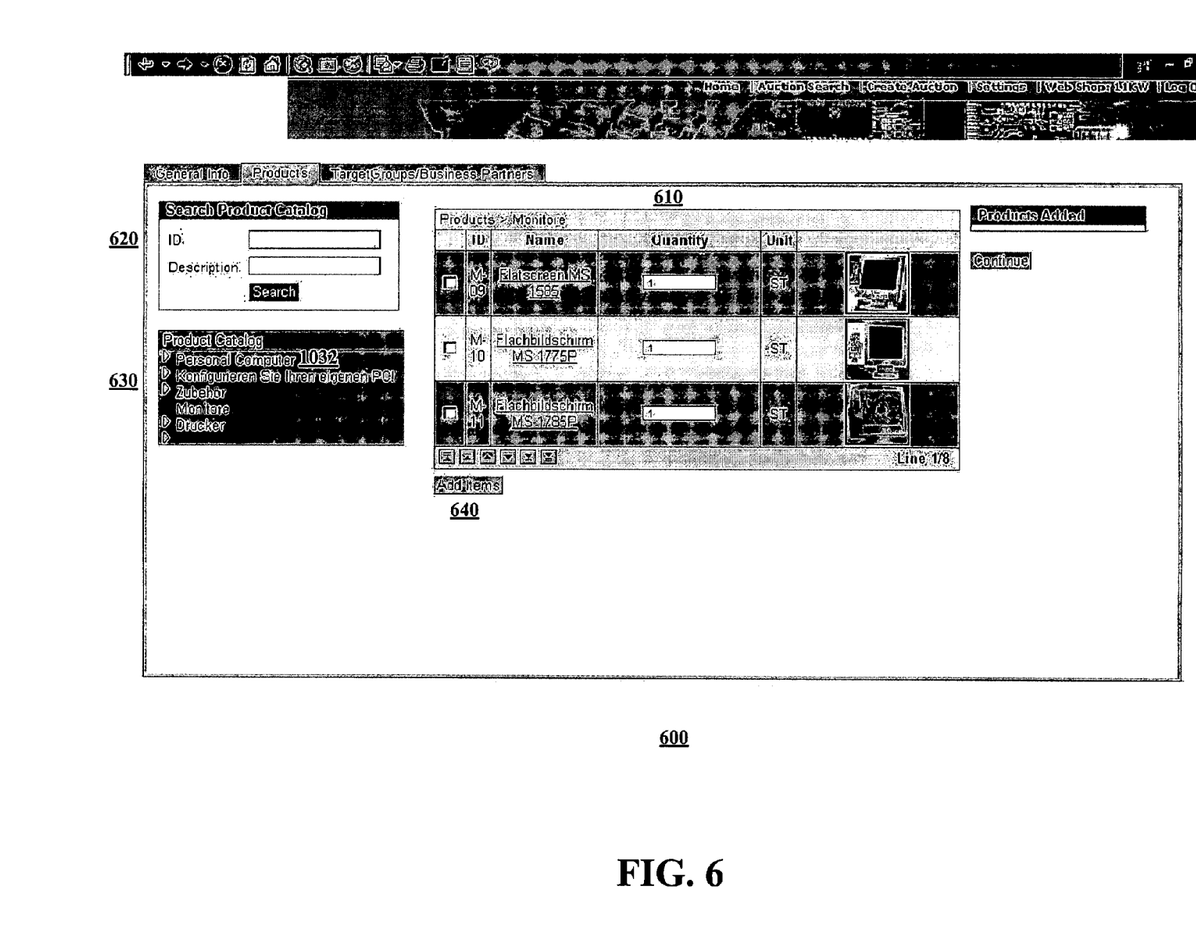
FIG. 6 is a screen shot from an internal auction application illustrating the browsing of a product catalog during the auction creation process in an integrated internal auction system according to one embodiment of the present invention.

FIG. 6 is a screen shot from an internal auction application illustrating the browsing of a product catalog during the auction creation process in an integrated internal auction system according to one embodiment of the present invention. An internal auction application screen 600 is displayed containing example product catalog data in a table 610 shown on the screen 600. A search box 620 is provided to allow a seller using the internal auction application to rapidly find the desired product in the product catalog table 610. A category refinement box 630 is included to allow a seller using the internal auction application to limit the products and/or services shown in the product catalog table 610 to a particular category. As previously stated, a seller may browse the product catalog table 610 and select the products and/or services to be used in the auction. The seller then adds the products to an auction using the add items button 640 in this example. The other auction parameters may be provided by default using, for example, an auction profile as previously discussed. In this example shown, the seller may then modify the auction parameters and products before the auction is saved, published, and/or activated.

Figure 7:
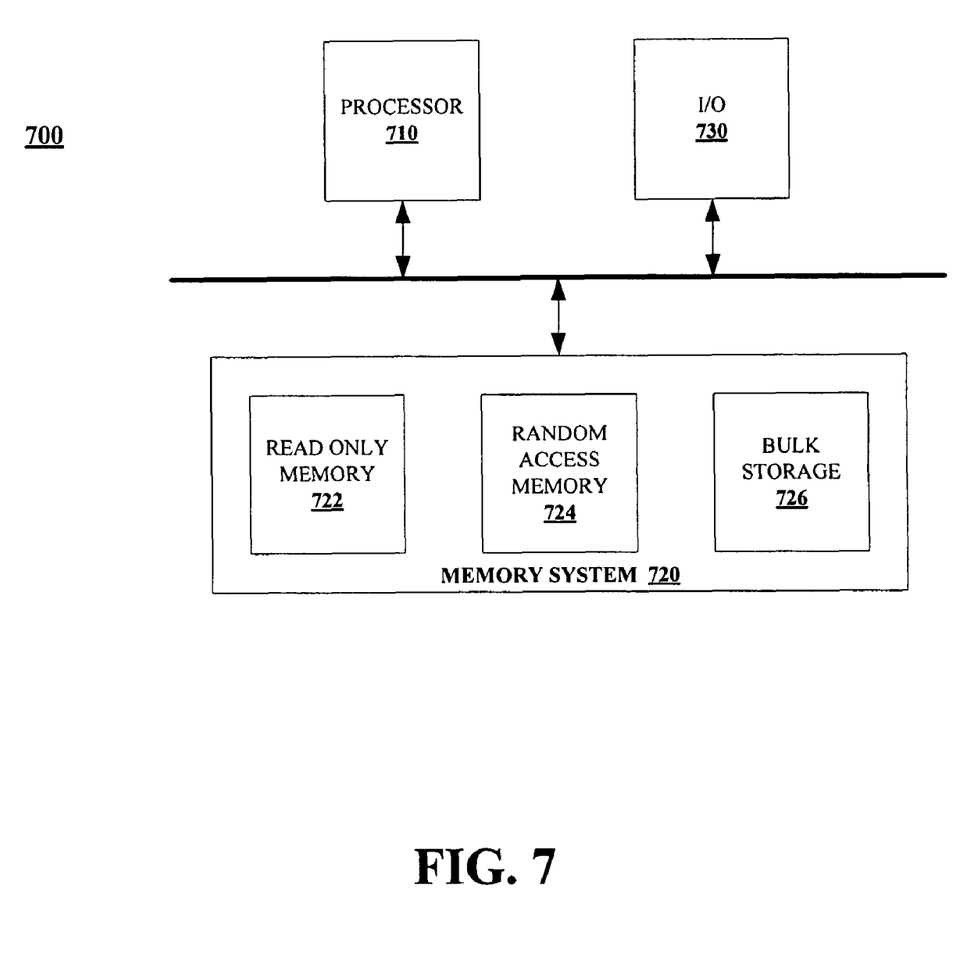
FIG. 7 is a block diagram illustrating the platform on which the method and system for generating an auction using a product catalog in an integrated internal auction system operate according to one embodiment of the present invention.

FIG. 7 is a block diagram illustrating the platform on which the method and system for generating an auction using a product catalog in an integrated internal auction system operates according to one embodiment of the present invention. Functionality of the foregoing embodiments may be provided on various computer platforms executing program instructions. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

What is claimed is:

1. A method for generating an auction in an internal auction system in a computer application, the method comprising:

selecting, via a processor, a product from an existing product catalog based on a seller's input, wherein the product catalog is maintained by an e-commerce system of a seller's business information management system;

receiving a set of product parameters from the seller's business information management system as a function of the selected product;

generating default values for the auction in the internal auction system derived from an auction profile of the seller stored by the seller's business information management system;

defining a set of auction parameters by the processor using an auction application, the auction application also supported by the seller's business information management system but executed separately from the e-commerce system, wherein the set of auction parameters includes parameter(s) necessary to generate the auction in the internal auction system;

populating auction fields from the defined set of auction parameters;

generating the auction in the internal auction system as a function of the generated default values, the received set of product parameters and the defined set of auction parameters;

modifying auction parameters if desired by the seller after the creation of the auction; and adding additional products to the created auction.

2. The method according to claim 1, further comprising:

storing the auction profile for the seller, wherein the auction profile contains the defined set of auction parameters.

3. The method according to claim 2, the creating step further comprising:

creating the auction in the internal auction system as a function of the received set of product parameters and the stored auction profile, wherein the stored auction profile contains the defined set of auction parameters.

4. The method according to claim 1, wherein the set of auction parameters is defined specifically for the auction.

5. The method according to claim 1, further comprising:

adding, via a processor, an additional product to the auction, wherein the additional product is defined in the product catalog in the e-commerce system of the seller's business information management system and the additional product is added as a function of a communication between the auction application and the seller's business information management system.

6. The method according to claim 1, further comprising:

modifying at least one of the parameter(s) in the set of auction parameters as a function of a seller interaction with the auction application.

7. The method according to claim 1, wherein a set of instructions are adapted to execute the method.

8. A system for generating an auction in an internal auction system in a computer application using an existing product catalog, the system comprising:

a memory system;
an input/output unit; and
a processor,
wherein the processor is adapted to:
   select a product from the product catalog based on a seller's input,
wherein the product catalog is maintained by an e-commerce system of the seller's business information management system;
   receive a set of product parameters from the seller's information management system as a function of the selected product;
   generate default values to enable a rapid creation of the auction in the internal auction system using data contained in an auction profile for the seller;
   define a set of auction parameters using an auction application, the auction application also supported by the seller's business information management system but executed separately from the e-commerce system, wherein the set of auction parameters includes parameter(s) necessary to generate the auction in the internal auction system;
   populate auction fields from the defined set of auction parameters;
   generate the auction in the internal auction system as a function of the generated default values, the received set of product parameters and the defined set of auction parameters;
   modify auction parameters if desired by the seller after the creation of the auction; and
   add additional products to the created auction.

* * * * *